Jan. 8, 1929. Re. 17,190

H. E. MUCHNIC

RAILWAY CROSSING

Original Filed July 26, 1924

Witness:

Inventor

Henry E. Muchnic

By attorney

Paul Carpenter

Reissued Jan. 8, 1929. Re. 17,190

UNITED STATES PATENT OFFICE.

HENRY E. MUCHNIC, OF ATCHISON, KANSAS.

RAILWAY CROSSING.

Original No. 1,551,165, dated August 25, 1925, Serial No. 728,282, filed July 26, 1924. Application for reissue filed April 21, 1927. Serial No. 185,606.

This invention relates to improvements in railway crossings, and has for its object to provide a structure utilized to provide a continuation of a roadway across a railway track.

In my co-pending application, Serial No. 674,638, filed November 14, 1923, Patent No. 1,551,164, granted August 25, 1925, I have illustrated a somewhat similar structure as applied to an existing trackway. In the herein described invention, I have illustrated a modified structure utilized in conjunction with a concrete roadway.

The object of the present invention is to provide and secure a quickly applied means to lock the crossing plates to the track rails and to insulate the same therefrom to prevent short-circuiting of current for signalling or the like.

These and other objects will be more fully described in the following specifications and shown in the accompanying drawing, in which—

Like numerals refer to like elements throughout the drawings, in which 10 designates generally the track rails having the usual head portions $10^a$, web portions $10^d$, and transverse base flanges $10^b$ and $10^c$. The rails are supported in the usual manner upon ties or sleepers 12. I have illustrated a portion of the concrete roadway at either side of the track which, in the embodiment shown, is a single track line, although my invention is readily applicable to double or other track systems as will be obvious.

At the outer side of each rail is provided an approach plate 50, each plate having an edge $50^a$ inset in the concrete C. Depending webs $50^b$ are supported between the transverse ties 12, while a face flange $50^c$ projects slightly forward from the approach plate to partially underlie the rail head $10^a$, being supported on the flange $10^b$ therebeneath.

Figure 1:
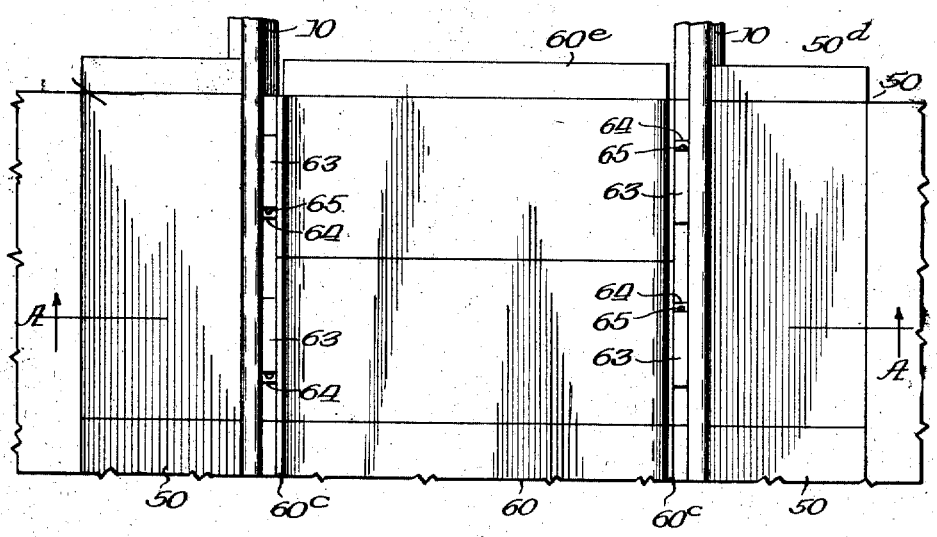
Figure 1 is a plan view of one embodiment of my invention.
Figure 3:
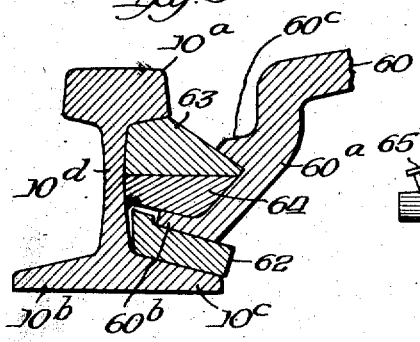
Figure 3 is a vertical section drawn to an enlarged scale of a portion of the structure showing the locking means.
Figure 4:
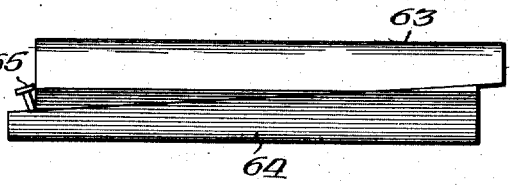
Figure 4 is a side elevation of a pair of co-acting wedge blocks.
Figure 2:
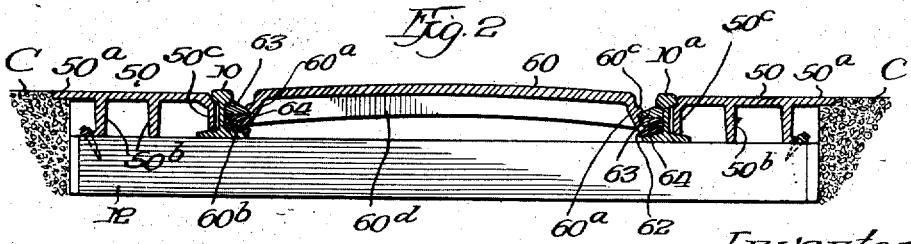
Figure 2 is a vertical transverse section along the line A—A of Figure 1.

The intermediate plates are designated by the numeral 60, and extend between and are supported upon the rail flanges as shown in Figure 2, for example. In the form shown, the plates 60 are provided with the flanges $60^a$, each having an angularly disposed, outwardly directed, bottom portion $60^b$, and an outwardly projecting rib $60^c$, forming with the adjacent bottom portion $60^b$, a groove or seat. Strips 62 of wood, fiber or other insulating material are interposed between the flanged bottom portion $60^b$ and the rail flanges $10^c$ upon which they are supported, thus preventing short-circuiting of currents for signalling or the like. Instead of utilizing a single locking block, as in the above described form, I utilize pairs of co-acting wedge blocks 63 and 64, fitting in the grooves between the rib $60^c$ and bottom portion $60^b$, and having inclined contact surfaces as shown in Figure 4 whereby relative displacement of one block with respect to its complemental block will increase the locking of the intermediate plate to the rail, as will be obvious. The nail or the like, indicated by the numeral 65, is driven into each lower wedge block 64 as shown in Figure 4 after positioning of the blocks to prevent relative displacement thereof, which would release and permit vertical displacement of the plates. The wedges being in pairs are quickly insertable where desired, no wedging resistance being present until the upper section is moved relative to the bottom section.

Transverse ribs or stiffening flanges $60^d$ are cast or formed integrally with the plate 60 to increase the strength and rigidity thereof.

At its ends the intermediate crossing is provided with the sloping aprons $60^e$ and the approach with aprons $50^d$ extending downwardly and outwardly to adjacent the roadbed. This prevents engagement of the structure by chains, hose, or the like dangling from passing trains.

It will be obvious that by the structure above described and shown in the drawing, I am enabled to provide a strong crossing between and at the sides of the track, thus continuing a roadway without bumps or appreciable interruptions, the crossing being capable of economical construction of cast iron or the like, and also capable of being quickly removed or installed, ready access to the roadway being afforded in the event of necessary repairs or the like. Any width of roadway may be accommodated by forming the plates integrally or in unit sections as desired.

It will be obvious that my invention is susceptible of modification, and I do not wish to be restricted to the form shown and described, except as defined in the appended claims.

What I claim is:

1. In combination with a pair of track rails having base flanges, a plate member extending between the said rails, said plate member having depending supporting flanges supported upon said rail flanges, and pairs of coacting wedges co-acting with said plate and said rails to lock the former relative to the latter.

2. In combination with a pair of track rails having base flanges, a plate member extending between the said rails, said plate member having depending supporting flanges, and locking means co-acting with said plate and said rails to lock the former relative to the latter, said locking means comprising a pair of co-acting wedges.

3. In combination with a pair of track rails having base flanges, a plate member having a depending supporting flange, locking means co-acting with said plate and the adjacent rail, said locking means comprising a pair of coacting wedges located between said plate flange and said rail.

4. In combination with a pair of rails having base flanges, a plate member extending between said rails and provided with a downwardly extending supporting flange, said flange having a seat and a locking wedge coacting with the adjacent rail and said seat to lock said plate against vertical displacement relative to said rail.

5. In combination with a pair of track rails having base flanges, a plate member extending between said rails and having a depending supporting flange, said flange being provided with an angularly disposed bottom portion supported upon a rail flange, and locking means co-acting with said bottom portion and said rail to prevent relative displacement of said plate with respect to said rail.

6. In combination with a track rail and the base flange thereof, a plate member in engagement therewith, said plate member having a depending supporting flange supported upon said base flange and means to hold said flange in position disposed between the rail head and said plate flange.

7. In combination with a track rail and the base flange thereof, a plate member in engagement therewith, said plate member having a depending supporting flange supported upon said base flange and means coacting with said rail head and said plate flange to lock the plate relative to the rail.

8. In combination with a pair of track rails, a plate member extending between said rails, said plate member having depending supporting flanges, offset portions on said flanges extending beneath the rail head and fastening means between said offset portion and said rail head coacting to lock the plate relative to the rail.

9. In combination with a pair of track rails, a plate member extending between said rails, said plate member having depending supporting flanges offset whereby the overall dimensions are greater than the distance between the rail heads and means coacting with said offset portions and said rail heads to lock the plate to the rail.

10. In combination with a pair of track rails, a plate member extending between said rails, said plate member having depending supporting flanges offset whereby the overall dimensions are greater than the distance between the rail heads and means coacting with said offset portions and said rail heads to lock the plate to the rail comprising wedge members.

11. In combination with a pair of track rails having base flanges, a plate member extending between said rails, and bridging the space therebetween said plate member having depending supporting flanges supported upon said rail flanges, and insulating means disposed therebetween, said insulating means being disposed along lines in substantial parallelism with said base flanges, and locking means engaging said track rail, disposing said supporting flanges against displacement relatively to said insulating means.

12. In combination with a pair of track rails having angularly disposed base flanges, insulating means disposed upon said base flanges, a plate member extending between said rails, said plate member having depending supporting flanges supported upon said insulating means and locking means coacting with said rail head and plate flange to hold said plate and said rails locked relatively to each other.

13. In combination with a railway crossing and the track rails thereof, a crossing plate arranged to have the surface thereof substantially flush with the heads of the rails, said plate including a rail engaging edge comprising a downwardly disposed supporting flange adapted to be supported upon the base flanges of said track rail, and a member positioned between said flange and said rail head to hold said rail and plate relatively locked against vertical and lateral displacement.

14. In combination with a pair of track rails having angularly disposed base flanges, a plate member extending between said rails, said plate member having depending supporting flanges each including an offset portion substantially parallel with said base flanges and means to lock said plate relatively to said rails, including a member disposed between said offset portion and said rail head.

15. In a railway crossing, a plate adapted to be disposed substantially flush with the rail heads thereof, a rail engaging edge including by said plate comprising a downwardly disposed supporting flange adapted to be supported on said rail base flanges, said downwardly disposed flange including an offset portion and a projecting rib forming a housing for fastening elements comprising rail head engaging wedges.

16. In combination with a pair of track rails having base flanges, a plurality of plate members extending between said rails, each of said plates having depending supporting flanges supported upon said rail base flanges and means disposed between said depending supporting flanges and said rail heads whereby said plates are independently locked in engagement with said rails.

17. In combination with a pair of track rails and the base flanges thereof, a plate member disposed therebetween bridging the intermediate space and supported upon the base flanges of the rails and means to hold said plate against vertical displacement, engaging the rails.

18. In combination with a pair of track rails and the base flanges thereof, a plate member disposed therebetween freely bridging the intermediate space and supported upon the base flanges and means disposed exteriorly of said plate to hold said plate against vertical displacement, engaging the rails.

19. In combination with a pair of track rails and the base flanges thereof, a plate member disposed therebetween bridging the intermediate space and supported upon the base flanges comprising downwardly disposed flanges on said plate member and means disposed exteriorly of said plate and flanges to hold said plate against vertical displacement, engaging the rails and disposed against said rail heads.

20. In combination with a pair of track rails and the base flanges thereof, a plate member disposed therebetween bridging the intermediate space and supported upon the base flanges of the rails by end flanges, formed on said plates, said end flanges cooperating with means included by said end flanges engaging the rails to hold said plate against vertical displacement.

21. In combination with a pair of track rails and the base flanges thereof, a plate member disposed therebetween bridging the intermediate space supported upon the base flanges of the rails by end flanges formed on said plates, said end flanges being formed to be clear of the rail ball of the track rails and cooperating with means included by said end flanges engaging the rails to hold said plate against vertical displacement upon the base flange of the rail.

In testimony whereof I have hereunder set my hand.

HENRY E. MUCHNIC.